UNITED STATES PATENT OFFICE.

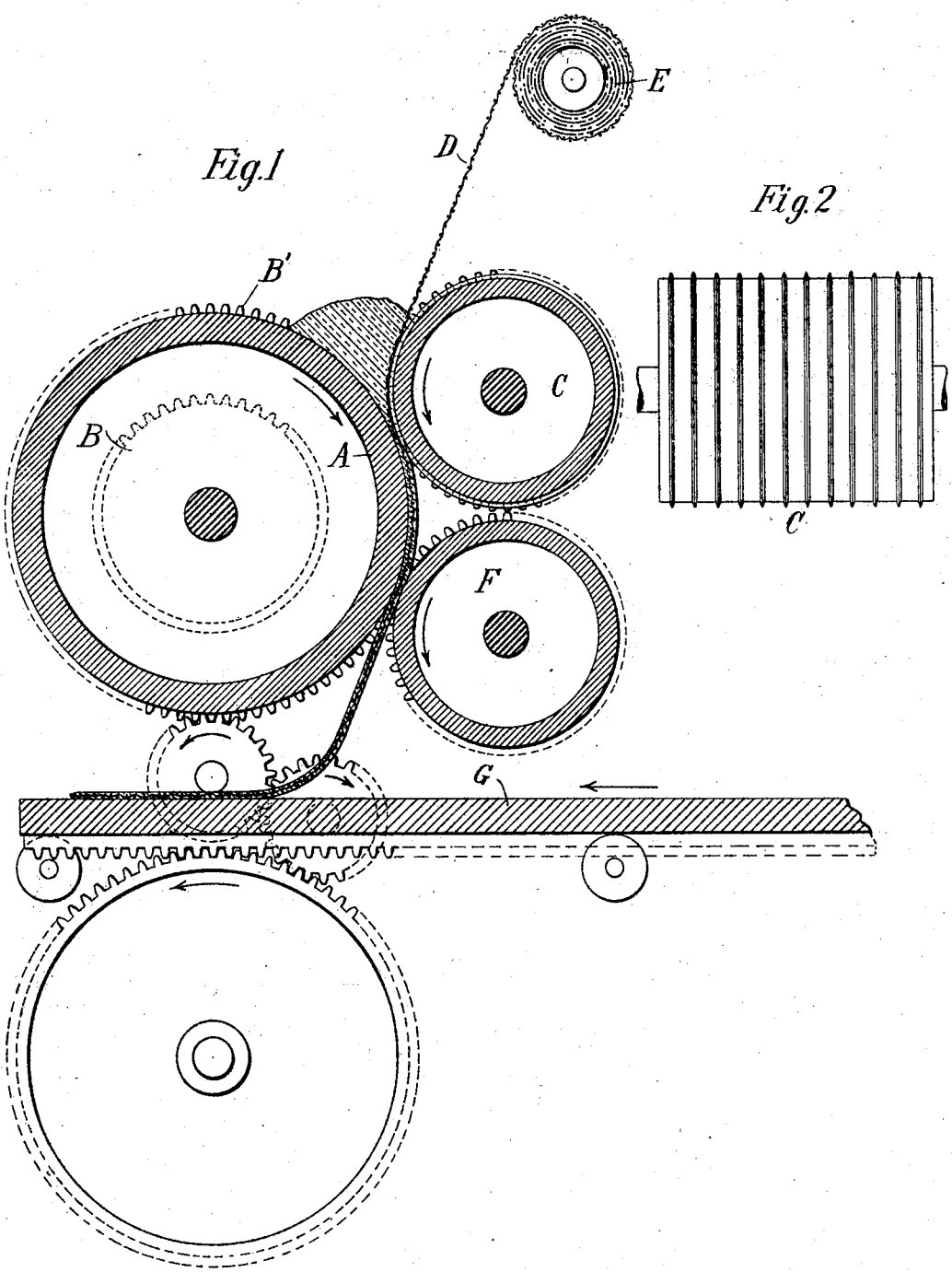

ARTHUR J. BALDWIN, OF EAST ORANGE, NEW JERSEY.

MACHINE FOR MAKING WIRE-GLASS.

No. 800,132.  Specification of Letters Patent.  Patented Sept. 26, 1905.

Application filed October 18, 1904. Serial No. 229,037.

*To all whom it may concern:*

Be it known that I, ARTHUR J. BALDWIN, a citizen of the United States, residing at East Orange, in the county of Essex and State of New Jersey, have invented certain new and useful Improvements in Machines for Making Wire-Glass, of which the following is a specification, reference being had to the drawings accompanying and forming a part of the same.

Figure 1 in said drawings is a vertical cross-sectional view of my improved machine, and Fig. 2 is a perspective view of one of the rolls used in the same.

This machine was devised by me in an effort to reduce the cost and simplify the construction of the machines in present use for the manufacture of wire-glass and which involve the use of a bed or table upon which the composite sheet of wire-glass or glass having a wire fabric or netting embedded therein is formed either in whole or in part by rolling. To manufacture sheets of wire-glass in long lengths by means of such machines requires a correspondingly long table, and this adds very greatly to the cost of manufacture, as such tables are of necessity complicated and expensive pieces of mechanism. I have therefore produced machines in which the operations of forming the layers of glass and associating the wire fabric therewith are performed by a system of rolls and the rolling-table dispensed with, and my present application is based on an improvement in this regard applicable to a particular process of making wire-glass. This process consists, essentially, in forming a layer of glass from a batch of molten metal, at the same time embedding therein a wire fabric by means of a corrugated or equivalent roller and then rolling the composite sheet between the smooth surface of a table and a second roll to close up the openings left by the wires and the projections on the embedding-roll.

My present improvement consists in the substitution for the table of a roller and the employment of a table only as a device for receiving the finished sheet and transferring it to the annealing-furnace. I have discovered that the sheet may be properly finished by its passage between two smooth-faced rolls, and, further, that the same rolls used in conjunction with the corrugated roll for forming the composite sheet may be used for this purpose. This improvement I will now describe by reference to the drawings.

A designates a cylindrical roll suitably mounted and adapted to be driven at a definite speed by any means such as ordinarily employed in this art, as by means of a cog-wheel B, indicated by dotted lines as fixed to its shaft. C is a second and smaller roll having corrugations or projections the depth of which is approximately one-half the thickness of the sheet which the machine is designed to produce, and hence one-half the distance between the peripheral surfaces of the two rolls. The roll C is also designed to be driven at substantially the same peripheral speed as roll A, as by means of a cog-wheel B'. A length of wire fabric or netting D is wound on a supply-reel E and is drawn down between the two rolls A and C. Beneath the roll C is a second roll F, having a smooth peripheral surface and adapted to be driven at the same peripheral speed as rolls A and C. It is mounted so as to leave a space between it and roll A approximately equal to the thickness of the finished sheet.

In operating this apparatus a batch of molten or plastic metal is deposited above and between the two rolls A and C, and the wire fabric is drawn down between the two rolls but in contact with the corrugated roll C. The system of rolls is then set in rotation, with the result that a sheet of glass is formed by rolls A and C, into which the wire fabric is forced by the projections on the latter. This sheet then passes between roll A and roll F, by which it is finished, the uneven or broken surface on the side through which the wires were forced being closed up by the roll F. As the finished sheet issues from between the rolls it is received on a transversely-moving bed or table G of suitable character to support and transfer it to the annealing-furnace.

In describing the roll F as one having a smooth surface I do not mean to imply that its surface is strictly plain, for either or both rolls A and F may have surfaces which will impart to the sheet any desired ornamental design, provided they be of such character as to properly close up and solidify the sheet.

I am aware that it has been proposed to run a wire fabric between two sheet-forming rolls together with and centrally with respect to the body of the glass; but such a process cannot be successfully carried out by any form of apparatus heretofore devised for the purpose, as it is not possible to produce in this way a finished sheet with the wires embedded therein at a uniform distance from its surface.

What I claim is—

The combination with the roll A, of a roll C provided with corrugations or projections, means for feeding a wire fabric between said rolls and in contact with roll C, and a finishing-roll F beneath the roll C and adapted to coöperate with roll A to receive and finish the composite sheet formed between rolls A and C, as set forth.

ARTHUR J. BALDWIN.

Witnesses:
M. LAWSON DYER,
S. S. DUNHAM.